UNITED STATES PATENT OFFICE.

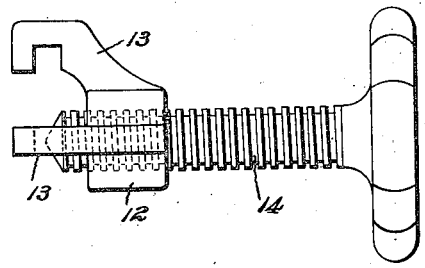
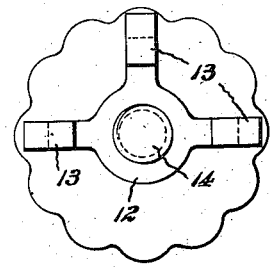
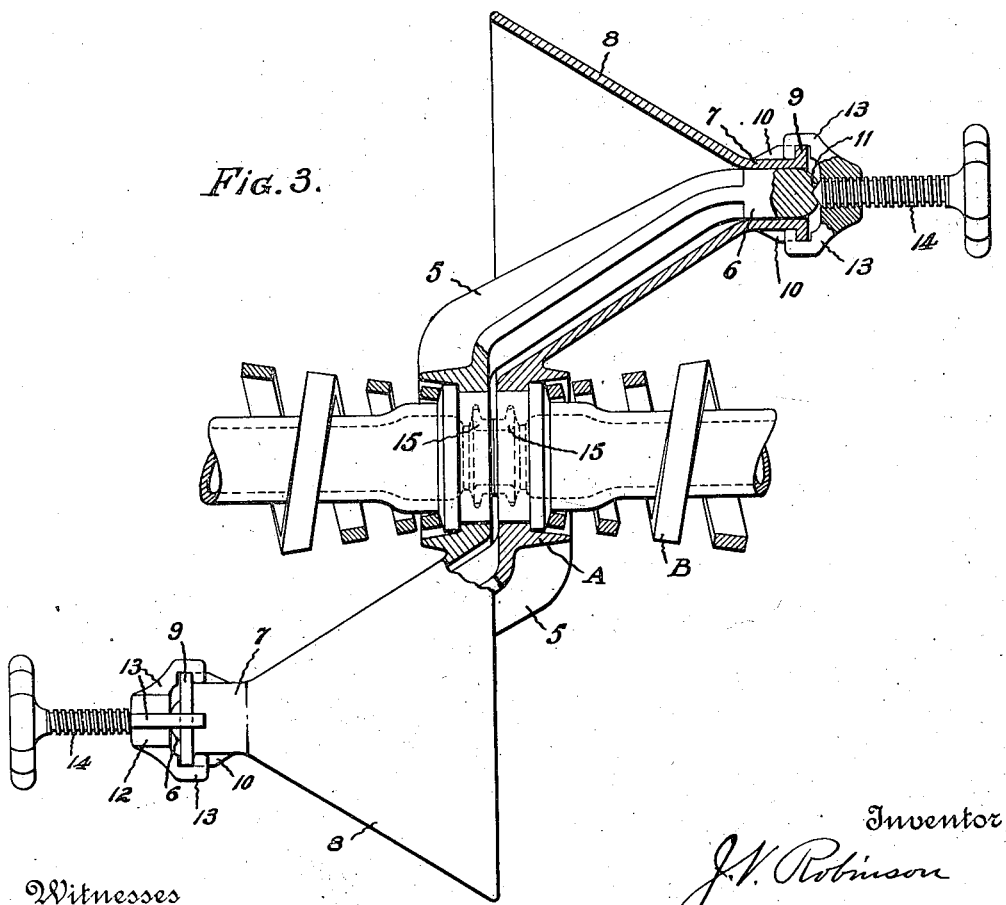

JOSEPH V. ROBINSON, OF BRANFORD, CONNECTICUT.

AUTOMATIC TRAIN-PIPE CONNECTOR.

1,245,790. Specification of Letters Patent. Patented Nov. 6, 1917.

Original application filed December 19, 1912, Serial No. 737,728. Divided and this application filed March 13, 1914, Serial No. 824,520. Renewed April 6, 1917. Serial No. 160,314.

*To all whom it may concern:*

Be it known that I, JOSEPH V. ROBINSON, a citizen of the United States, and a resident of Branford, county of New Haven, State of Conn., have invented certain new and useful Improvements in Automatic Train-Pipe Connectors, of which the following is a specification.

This is a division of my co-pending application Serial Number 737,728, filed December 19, 1912, for improvements in automatic train pipe couplers, and the present invention has for its object to provide an improved means of renewing defective gaskets between the faces of coupled coupler heads without first uncoupling the cars.

While the present invention is particularly adapted to coupler heads of the pin and funnel construction, it may be successfully used with any one of several well-known types. It is a means of renewing defective gaskets by which the coupler heads are parted without injury or danger to the operator and maintained substantially in alinement while separated. The improvement may be used interchangeably with any number of connectors in a train, is simple and compact and may be carried conveniently by the trainmen.

The invention consists in the combinations, arrangements and constructions hereinafter described, pointed out in the appended claims and illustrated in the accompanying drawings, in which:

Figure 1, is a side elevation of my improvement.

Fig. 2, is an end view thereof, and

Fig. 3, is a horizontal section of two coupler heads connected together, showing my improvement applied thereto.

Referring to the drawings, the coupling heads referred to in the following description of the use of my improved means of renewing defective gaskets, are supported in any suitable manner and are placed under pressure in coupling by a suitable means, such for instance as a spring B against the tension of which the heads are separated in making repairs.

I provide the coupling head A with a guiding prong 5, having a cylindrical portion 6 adapted to snugly fit within a corresponding portion 7 of the funnel 8 on an opposing head. The portion 7 is provided at its rear end with an annular flange 9 and one or more webs or lugs 10, and in the end of each of the cylindrical portions 6 of the prong 5, I form a socket 11.

My improvement, comprising a head or member 12 and spaced claws 13, is slipped over the cylindrical portion 7 and behind the annular flange 9 and against the webs 10 and threadingly receives a screw 14 which enters the socket 11 of the prong 5, so that by turning the screw 14 the faces of the coupling heads A are forced apart sufficiently to permit ready removal and replacement of the gaskets 15 of mating heads. During this operation rotary movement of the member 12 relative to the portion 7 is prevented by engagement of the claws 13 with the webs 10.

The socketing of the screw 14 in the cylindrical portions 6 of the prong prevents disalinement of the coupling heads when said portion 6 of the prong is forced out of the corresponding portion 7 of the funnel 8. When thus separating the heads under a condition of disalinement, one of the claws 13 of the member 12 is placed upon the funnel 8 so as to engage the portion 7 thereof at a point diametrically opposite to the direction the prong 5 of the heads would tend to travel when the heads are shifted from engagement and the prong 5 leaves the portion 7 of the funnel. This positioning of the member 12 removes the possibility of it being lifted off the funnel, permitting disalinement of the heads A when separated to repair defective gaskets under the conditions mentioned. One of these clamps should be provided for each coupling head in making repairs.

Having thus described my said invention, what I claim as new and desire to secure by United States Letters Patent is:

1. In an automatic train pipe coupling, the combination of a pair of coupled connector heads, guiding means for said heads, and means removably connected with said guiding means for separating said heads to permit removal and replacement of defective gaskets without uncoupling the cars.

2. In an automatic train pipe coupling, the combination of a pair of coupled connector heads, guiding means for said heads, and manually operated screw means removably connected with said guiding means for separating said heads to permit removal and replacement of defective gaskets without uncoupling the cars.

3. In an automatic train pipe coupling, the combination of a pair of coupled connector heads provided with flaring guiding means, manually operated mechanism removably connected to said guiding means for separating said heads, and a stop on said guiding means for preventing rotation of said mechanism relative to said means.

4. In an automatic train pipe coupling, the combination with a pair of coupled connector heads and pin and funnel guiding means therefor, of manually operated means detachably carried by said funnels for moving said pins relative to the funnels to separate said heads without uncoupling the cars.

5. In an automatic train pipe coupling, the combination of a pair of coupled connector heads, pin and funnel guiding means therefor, a threaded clamp adapted to be connected with the funnel of one of said heads, and a screw mounted in said clamp and engaging the pin of the other head for moving the pin relative to the funnel to separate said heads without uncoupling the cars.

6. In an automatic train pipe coupling, the combination of a pair of coupled connector heads, pin and funnel gathering means therefor, a flange on the small end of said funnel, a threaded clamp provided with spaced claws for engaging said flange, means for preventing rotation of the clamp on the flange, and a screw carried by said clamp for moving the pin of one of said heads relative to the funnel of the other head.

7. In an automatic train pipe coupling, the combination with a pair of mated couplers having pin and funnel guiding means, of removable and interchangeable clamps adapted to be temporarily connected with the funnels and having screws for forcing the pins out of their seats in the funnels to separate the faces of the couplers and hold the same separated for the purpose set forth.

8. In an automatic train pipe coupling, the combination with a pair of coupled train pipe heads provided with flaring guiding means, of means removably connected with said guiding means for relatively shifting said heads and for preventing disalinement thereof in the shifted position.

9. In an automatic train pipe coupling, the combination of a coupling head provided with pin and funnel guiding means, a pin in said funnel provided with a socket, and means seated in said socket and removably supported by said funnel for shifting the pin relative to the funnel and preventing disalinement thereof in the shifted position.

In testimony whereof, I have hereunto set my hand in the presence of two witnesses.

JOSEPH V. ROBINSON.

In the presence of—
ARTHUR L. BRYANT,
S. C. McBRIDE.